US006796278B2

(12) United States Patent
Ryan, III

(10) Patent No.: US 6,796,278 B2
(45) Date of Patent: Sep. 28, 2004

(54) METHODS AND APPARATUSES FOR LASER IGNITED ENGINES

(75) Inventor: Thomas W. Ryan, III, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 10/155,896

(22) Filed: May 24, 2002

(65) Prior Publication Data

US 2002/0185097 A1 Dec. 12, 2002

Related U.S. Application Data

(60) Provisional application No. 60/293,556, filed on May 24, 2001.

(51) Int. Cl.[7] .............................................. F02P 23/00
(52) U.S. Cl. .................................................. 123/143 B
(58) Field of Search ........................... 123/143 B, 536, 123/606, 143 R

(56) References Cited

U.S. PATENT DOCUMENTS

| | | | |
|---|---|---|---|
| 3,861,371 A | 1/1975 | Gamell | 123/148 |
| 4,416,226 A | 11/1983 | Nishida et al. | 123/143 |
| 4,434,753 A | 3/1984 | Mukainakano et al. | 123/143 |
| 4,726,336 A | 2/1988 | Hoppie et al. | 123/292 |
| 4,852,529 A | 8/1989 | Vowles | 123/143 |
| 4,947,640 A | 8/1990 | Few et al. | 60/39.06 |
| 5,058,548 A | 10/1991 | Morikawa et al. | 123/298 |
| 5,155,047 A | 10/1992 | Cioni et al. | 436/139 |
| 5,328,665 A | 7/1994 | Geiger | 422/105 |
| 5,361,737 A | 11/1994 | Smith et al. | 123/143 |
| 5,367,869 A | 11/1994 | DeFreitas | 60/39.06 |
| 5,404,712 A | 4/1995 | Few et al. | 60/39.821 |
| 5,485,720 A | 1/1996 | Few et al. | 60/39.821 |
| 5,497,612 A | 3/1996 | Few et al. | 60/39.06 |
| 5,515,681 A | 5/1996 | DeFreitas | 60/740 |

(List continued on next page.)

FOREIGN PATENT DOCUMENTS

| | | |
|---|---|---|
| GB | 1 360 196 | 7/1974 |
| JP | 63 173852 | 7/1988 |
| JP | 63253111 | 10/1988 |
| JP | 05033755 | 2/1993 |
| JP | 09042138 | 2/1997 |

OTHER PUBLICATIONS

Lavid et al., "Excimer laser relight for the supersonic commercial transport aircraft," *SPIE*, 1862:59–70, 1993.
Liou and Culley, "Laser ignition application in a space experiment," *SPIE*, 1862:71–82, 1993.
Ma et al., "Nd: YAG laser ignition of natural gas," *Proc. of the Spring Technical Conference of the ASME Internal Combustion Engine Division*, 30–3:117–125, 1998.
Ishida et al., "Fundamental study on the laser ignition methanol diesel engine," *ICE–vol. 27–3, 1996 Fall Technical Conference*, 3:1–8, 1996.
Lavid, "Infrared multiphoton ignition and combustion enhancement of natural gas," *Final Report prepared for Gas Research Institute*, 1992.

Primary Examiner—Bibhu Mohanty
(74) Attorney, Agent, or Firm—Fulbright & Jaworski, LLP

(57) ABSTRACT

Methods and apparatuses for laser ignition in an internal combustion engine. Laser radiation is directed to an ignition location within a combustion chamber with adaptive optics, and the position of the ignition location is adaptively adjusted during operation of the engine using the adaptive optics. Multiple ignition locations may be provided during a cycle of an internal combustion engine. A first pulse of laser radiation is directed to a first ignition location within a combustion chamber with adaptive optics, and a second pulse of laser radiation is directed to a second ignition location within the combustion chamber using the adaptive optics.

36 Claims, 8 Drawing Sheets

U.S. PATENT DOCUMENTS

| | | | |
|---|---|---|---|
| 5,524,429 A | 6/1996 | Few et al. | 60/39.06 |
| 5,542,247 A | 8/1996 | Bushman | 60/203.1 |
| 5,590,517 A | 1/1997 | DeFreitas | 60/39.06 |
| 5,598,699 A | 2/1997 | Few et al. | 60/39.821 |
| 5,628,180 A | 5/1997 | DeFreitas | 60/39.06 |
| 5,673,550 A | 10/1997 | Few et al. | 60/39.06 |
| 5,756,924 A | 5/1998 | Early | 102/201 |
| 5,769,621 A | 6/1998 | Early et al. | 431/2 |
| 5,799,628 A | 9/1998 | Lacerda | 123/52.3 |
| 5,876,195 A | 3/1999 | Early | 431/11 |
| 5,983,871 A | 11/1999 | Gordon et al. | 123/536 |
| 6,053,140 A | 4/2000 | Feichtinger et al. | 123/143 |
| 6,581,581 B1 * | 6/2003 | Bebich | 123/536 |

* cited by examiner

METHODS AND APPARATUSES FOR LASER IGNITED ENGINES

This invention claims the benefit of U.S. Provisional Application Serial No. 60/293,556, entitled "Methods and apparatuses for laser ignited engines" by Thomas W. Ryan III, filed May 24, 2001, which is hereby incorporated by reference.

BACKGROUND OF THE INVENTION

1. Field of the Invention

The present invention relates generally to the field of internal combustion engines. More particularly, it concerns methods and apparatuses for using laser ignition to adaptively adjust the position of one or more ignition locations within a combustion chamber during operation of an engine. It also concerns methods and apparatuses for providing multiple ignition locations during a single cycle of engine operation.

2. Description of Related Art

In a usual ignition apparatus for an internal combustion engine, a high voltage is applied to an ignition plug that is fixed on the wall surface of a combustion chamber in order to ignite an air-fuel mixture by spark discharge. In an ignition apparatus of this kind, however, several problems arise. For instance, since the ignition plug is exposed directly to the combustion chamber, carbon attaches to the ignition plug to render the discharge of the ignition plug difficult. Furthermore, due to a heat loss of the electrodes of the ignition plug, a torch or nucleus of flame generated by the discharge is cooled, and vanishes before reaching a flame. Since the ignition occurs on or very near the wall surface of the combustion chamber, the air-fuel mixture is more difficult to ignite than it would be at the center part of the chamber. Even if it is ignited, it takes a considerable time before the flame spreads over the whole space of the combustion chamber. Further, because the ignition occurs on or very near the wall surface, poor mixing often results due to the difficulties associated with burning fuel from the wall surface.

The problems mentioned above are present not only in conventional carburetor-type engines and port injection engines, but also in newer-generation, direct-injection engines, which have come about, in part, due to ever decreasing $NO_x$ emissions standards that require leaner air/fuel ratios. Shown in FIG. 1 is a port injection engine 2. Included in this engine are an inlet port 12, inlet valve 4, exhaust port 14, exhaust valve 6, fuel injector 10, spark plug 8, combustion chamber 17, and piston 16. Air enters the combustion chamber 17 from the inlet port 12 via the inlet valve 4 (with exhaust valve 6 closed). This air is pre-mixed with fuel from fuel injector 10 prior to entering the combustion chamber 17 (i.e., the mixture is "port-injected"). The fuel-air mixture is compressed with piston 16 and then ignited by spark plug 8, forcing the piston 16 downwards in what is called a power-stroke. Exhaust gases may then exit the engine through exhaust port 14 via exhaust valve 6 (with inlet valve 4 closed).

Glancing at FIG. 1, it is apparent that the geometry of the system mandates that the fuel gas mixture be directed toward walls of the combustion chamber 17. Thus, ignition via the confined spark plug 8 must overcome the corresponding quenching and poor mixing discussed above.

Shown in FIG. 2 is a direct injection engine 20, which suffers from the same problems discussed above. In fact, the quenching and poor mixing suffered by the port injection engine 2 may be exacerbated in the direct engines due to the need to have a fuel rich mixture near the spark plug and the resulting very tight physical clearances within the combustion chamber. Engine 20 includes an inlet port 12, inlet valve 4, exhaust port 14, exhaust valve 6, fuel injector 10, spark plug 8, combustion chamber 17, and piston 16. Air enters the combustion chamber 17 from the inlet port 12 via the inlet valve 4 (with exhaust valve 6 closed). The fuel is mixed with this air "directly" within the combustion chamber 17 (with valves 4 and 6 closed). The gas-fuel mixture is compressed with piston 16 and then ignited by the spark plug 8, forcing the piston 16 downwards in the power-stroke. Exhaust gases may then exit the engine through exhaust port 14 via the exhaust vale 6 (with inlet valve 4 closed).

It is apparent that, in FIG. 2, the fuel injector 10 and spark plug 8 may be even more physically constrained than in FIG. 1. Due to the illustrated geometry, the fuel must be directed toward the spark plug and the walls of the combustion chamber 17. Correspondingly, ignition via the confined spark plug 8 must overcome quenching and poor mixing conditions associated with the cold boundary layer of the walls of combustion chamber 17.

Several attempts have been made to address these and other numerous, well-known problems in the art of internal combustion engines. One of the most common attempts involves controlling the fuel and air flow within an engine. For instance, to address mixing problems, others have used intake air motion to provide tumble or swirl. Shown in FIG. 3, which illustrates a direct injection engine 30, is a piston 16 having a shaped top 19. Top 19, during operation of the engine, creates a fluid flow pattern (both air and fuel) within combustion chamber 17 that generally resembles the curved arrow illustrated in FIG. 3. In particular, fuel and air "tumble" within combustion chamber 17, easing, at least to a degree, some of the deleterious effects of quenching and poor mixing.

Other shaped piston tops and arrangements of different components can lead to different fluid flow patterns, as is known in the art. For example, U.S. Pat. No. 5,058,548, which is hereby incorporated by reference in its entirety, involves an arc-shaped offset cavity in the roof of a combustion chamber and an injector for injecting fuel in the form of a cone. Other examples include effecting the following flows: swirling, swishing, and reverse tumbling, to name a few.

Although such methods have exhibited at least a degree of success, room for improvement remains because these methods are still hampered by the fixed, confined location of ignition. Moreover, quenching and poor mixing problems, although reduced, can still remain troublesome. Further, controlling the fuel injection and the in-cylinder air motion in these aerodynamically dominated systems may be very complex because the air motion and injection processes must change significantly as the engine load changes. At light load, for instance, the fuel is injected late in the compression stroke, into the vicinity of the spark plug, which is located very close to the combustion chamber wall. This is accomplished by a combination of fuel jet modifications, surface interactions, and controlled air motion. Conversely, at high load, the fuel is injected very early during the compression stroke, and efforts must be made to completely mix the fuel and air to homogeneous stoichiometric conditions prior to ignition. Such complexities detract from certain advantages these methods may provide.

Another attempted solution to problems discussed herein involves laser ignition rather than ignition by a spark plug.

The following representative patents that disclose this, or related, approaches are: U.S. Pat. Nos. 6,053,140; 5,769,621; 5,756,924; 4,852,529; 4,434,753; and 4,416,226, all of which are hereby incorporated by reference in their entirety.

U.S. Pat. No. 6,053,140 discusses an internal combustion engine with externally supplied ignition, where a compressed air-fuel mixture is ignited, at least partially, with the use of at least one laser beam. The laser beam can be introduced into a combustion chamber via at least one optical waveguide and is focused onto an ignition location. The optical waveguide is positioned in a sealing element bounding the combustion chamber, and the sealing element is located in a cutting plane through the combustion chamber and preferably is constituted by a cylinder head gasket.

U.S. Pat. No. 5,769,621 discusses a method of fuel/oxidizer ignition comprising: (a) application of laser light to a material surface which is absorptive to the laser radiation; (b) heating of the material surface with the laser light to produce a high temperature ablation plume which emanates from the heated surface as an intensely hot cloud of vaporized surface material; and (c) contacting the fuel/oxidizer mixture with the hot ablation cloud at or near the surface of the material in order to heat the fuel to a temperature sufficient to initiate fuel ignition.

U.S. Pat. No. 5,756,924 discusses techniques whereby two or more laser light pulses with certain differing temporal lengths and peak pulse powers are employed sequentially to regulate the rate and duration of laser energy delivery to fuel mixtures to improve fuel ignition performance over a wide range of fuel parameters such as fuel/oxidizer ratios, fuel droplet size, number density and velocity within a fuel aerosol, and initial fuel temperatures.

U.S. Pat. No. 4,852,529 discusses an ignition system for internal combustion engines. The ignition system includes a laser energy generator that is arranged to supply laser energy continuously at an energy level less than that needed to initiate combustion with the energy level being spiked in timed sequence and delivered to the combustion chambers of the engine. The system also includes optic means for focussing the pulsed laser energy at predetermined points within the combustion chambers whereby the focussed laser energy is sufficient to ignite any combustible charge within the combustion chambers, the pulsed laser energy being delivered through a purging chamber to the respective combustion chambers with a purging gas being continuously supplied to the purging chamber to prevent combustion gases flowing towards the laser optic means.

U.S. Pat. No. 4,434,753 discusses an ignition apparatus for an internal combustion engine that includes an intake path supplying a mixture of air and fuel into the combustion chamber of the engine, a particle supplying unit having an ejection port opening into the combustion chamber for supplying minute particles of a material which is not the fuel and has a high light absorption factor, and a light source radiating a laser beam through a light focusing unit toward a suitably selected position in the internal space of the combustion chamber. The laser beam strikes the minute particles of high light absorption factor supplied from the particle supplying unit to produce a torch for igniting the air-fuel mixture.

U.S. Pat. No. 4,416,226 discusses a laser ignition apparatus that includes a laser oscillator that generates at least two successive pulse-shaped laser beams during each compression stroke of the engine. A first pulse-shaped laser beam is generated by a Q switching action of the laser oscillator and thus has a high peak output and a second pulse-shaped laser beam is generated without the Q switching action and has a low peak output but a larger pulse duration than the first laser beam. The first and second pulse-shaped laser beams are guided and directed into the combustion chamber of the engine, and the first laser beam of a high energy density causes the breakdown of the air-fuel mixture in the combustion chamber to develop a plasma. The second laser beam further increases the energy of the plasma to ensure the setting fire of the air-fuel mixture.

Although the systems of these patents may each offer their own significant advantages, they, however, suffer from shortcomings as well. For instance, it appears that none of the described systems allows for adaptive positioning, during an engine cycle, of one or more ignition locations. Rather, most of the described systems appear to employ a (single) ignition location that is fixed throughout cycles. These shortcomings, as will be discussed in detail below, do not allow for a great deal of flexibility. In particular, the described systems, like other conventional internal combustion systems, are forced to adjust the gas and/or air flow within the combustion chamber, which can be a very complex undertaking, to address problems and to improve performance. As described in the context of this invention, adaptively adjusting the ignition location during a cycle offers a better solution.

SUMMARY OF THE INVENTION

The disclosed invention overcomes problems mentioned above by eliminating the need to control the fuel and air mixing as functions of the engine speed and load; rather the ignition location may be changed using laser radiation and adaptive optics as described below.

The disclosed invention involves incorporation of a laser ignition system in any type of spark-ignition engine, including a direct-injection engine. The laser ignition system includes a pulsed laser of sufficient energy (e.g., 100 mJ/pulse or more in one embodiment) to create a discharge at the focal point of the focused laser beam. The system also includes a window and window holder to allow optical access into the combustion chamber for the laser pulse, and adaptive optics that allow adjustment of the location of the beam focal point within the combustion chamber. The laser ignition system may be combined with an engine configuration in which the fuel is injected directly into the combustion chamber. Several different combustion chamber configurations are possible.

Objectives of the present include, but are not limited to: (a) minimize fuel-wall interactions and (b) simplify the fuel injection and intake air motion control systems by moving the ignition location, rather than the fuel-air mixture and mixing locations, as is required with conventional electric spark discharge systems.

In one respect, the invention is a laser ignition apparatus for an internal combustion engine. It includes a combustion chamber, a laser, and adaptive optics. The combustion chamber defines one or more ignition locations. By "defines," it is meant that one or more ignition locations are located within the combustion chamber; the exact location (s) within the chamber is determined by the operation of the invention and, more particularly, by the operation of the adaptive optics. The laser is in optical communication with the combustion chamber. The adaptive optics are in optical communication with the combustion chamber and the laser and are configured to adaptively adjust the position of the one or more ignition locations during operation of the engine. As used herein, by "adaptively adjust," it is meant that the position may be adjusted, manually or automatically (by mechanical and/or electronic means) according to one or more operating conditions or parameters of the engine. For instance, the position may be adaptively adjusted to reduce engine knock. Alternatively, the position may adaptively adjusted according to engine load. Alternatively, the position may be adaptively adjusted according to the type of engine (e.g., direct-injection vs. port-injection engine or gasoline vs. natural gas engine). Any number of other operating conditions or parameters exist, as will be understood by one having ordinary skill in the art with the benefit of this disclosure. Any one or combination of those conditions or parameters may be adapted for by the adjustment in ignition location described herein.

In other respects, the internal combustion engine may include a gasoline engine. The internal combustion engine may include a direct injection gasoline engine. The internal combustion engine may include a port injected gasoline engine. The internal combustion engine may include a natural gas engine. The optics may be configured to adaptively adjust the position of the one or more ignition locations as a function of engine speed or load. The optics may be configured to adaptively adjust the position of the one or more ignition locations as a function of engine knock.

In one respect, the invention is a laser ignition apparatus for providing multiple ignition locations during a cycle of an internal combustion engine. The apparatus includes a combustion chamber, a pulsed laser, and adaptive optics. The combustion chamber defines a first and second ignition location. The pulsed laser is in optical communication with the combustion chamber. The adaptive optics are in optical communication with the combustion chamber and the laser, and the optics are configured to direct a first pulse of laser radiation to the first ignition location and a second pulse of laser radiation to the second ignition location during a single cycle of the engine.

In other respects, the adaptive optics may be further configured to adaptively adjust the position of the first or second ignition location during operation of the engine. The optics may be configured to adaptively adjust the position of the first or second ignition location as a function of engine speed or load. The optics may be configured to adaptively adjust the position of the first or second ignition location as a function of engine knock.

In one respect, the invention is a method for laser ignition in an internal combustion engine. Laser radiation is directed to an ignition location within a combustion chamber with adaptive optics. The position of the ignition location is adaptively adjusted during operation of the engine using the adaptive optics.

In other respects, the position of the ignition location may be adjusted as a function of engine speed or load. The position of the ignition location may be adjusted as a function of engine knock. The method may also include directing laser radiation to a combustion chamber window with the adaptive optics to clean the window.

In one respect, the invention is a method for providing multiple ignition locations during a cycle of an internal combustion engine. A first pulse of laser radiation is directed to a first ignition location within a combustion chamber with adaptive optics. A second pulse of laser radiation is directed to a second ignition location within the combustion chamber using the adaptive optics.

In other respects, the position of the first or second ignition location may be adaptively adjusted during operation of the engine using the adaptive optics. The position of the first or second ignition location may be adjusted as a function of engine speed or load. The position of the first or second ignition location may be adjusted as a function of engine knock. The method may also include directing a third pulse of laser radiation to a combustion chamber window with the adaptive optics to clean the window.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. These drawings illustrate by way of example and not limitation, and they use like references to indicate similar elements. The drawings include.

DESCRIPTION OF ILLUSTRATIVE EMBODIMENTS

Figure 1:
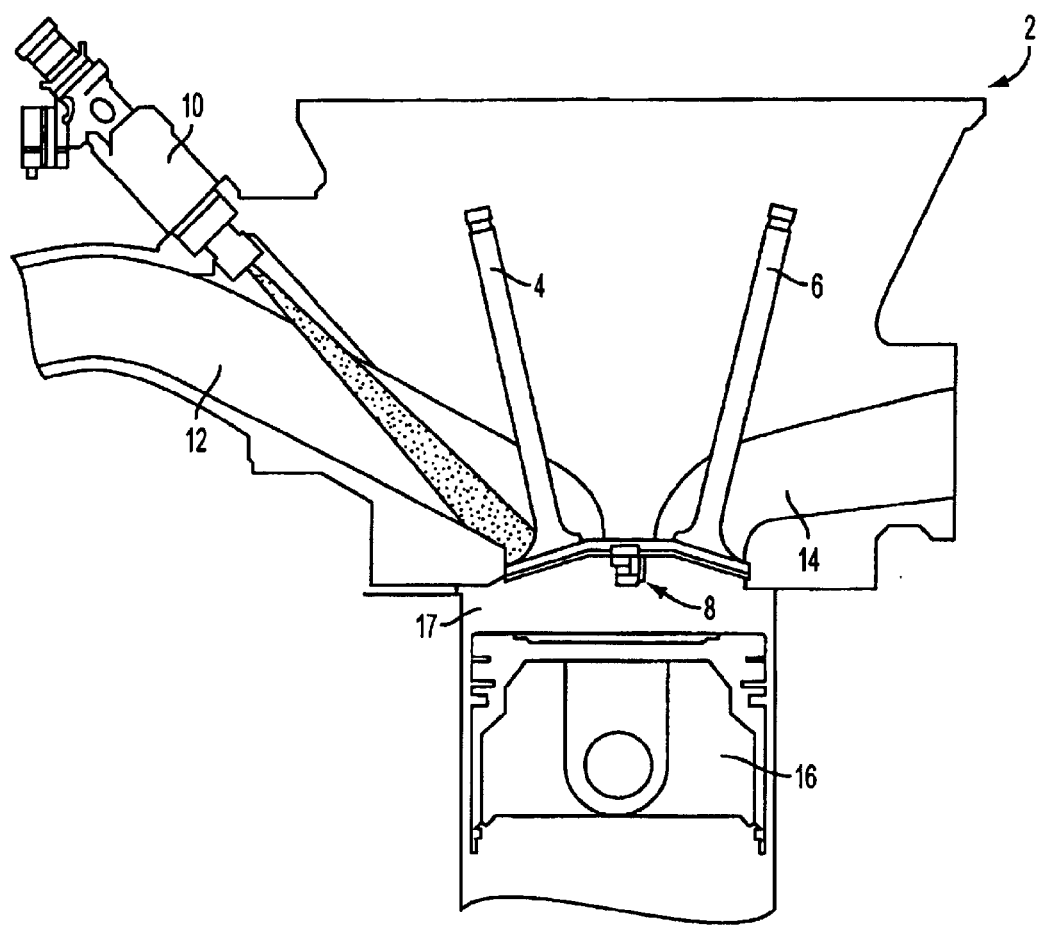
FIG. 1 shows a prior-art port-injection engine.
Figure 2:
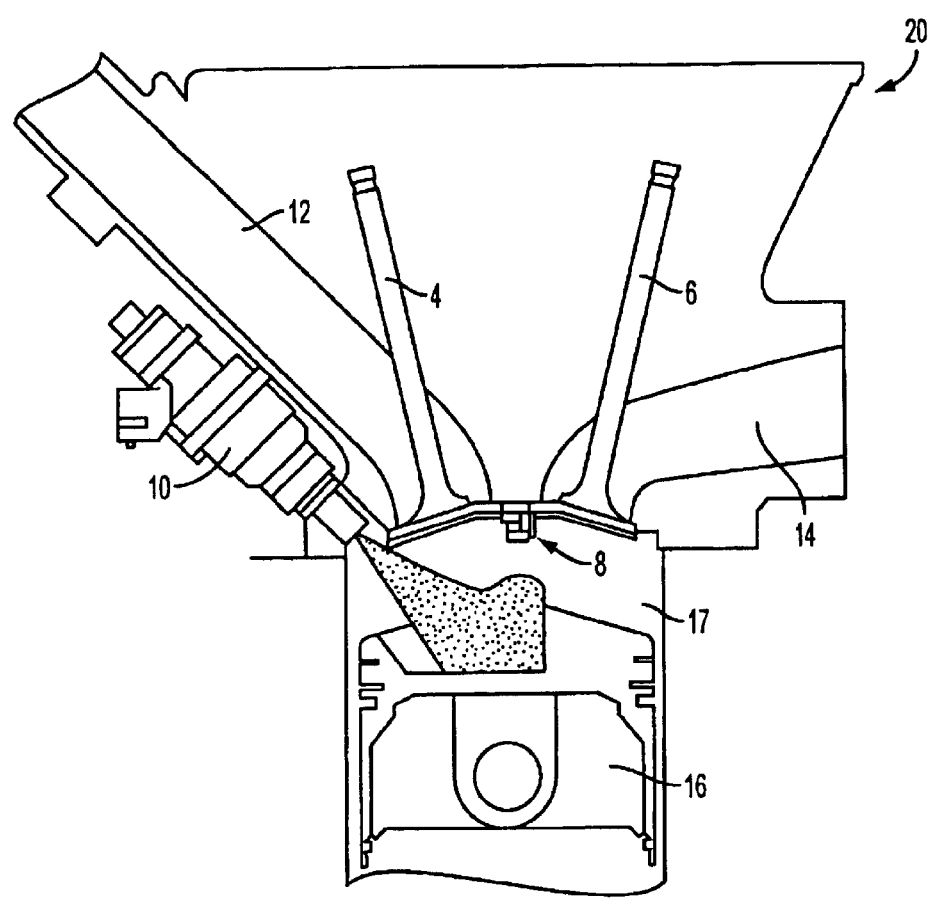
FIG. 2 shows a prior-art direct-injection engine.
Figure 3:
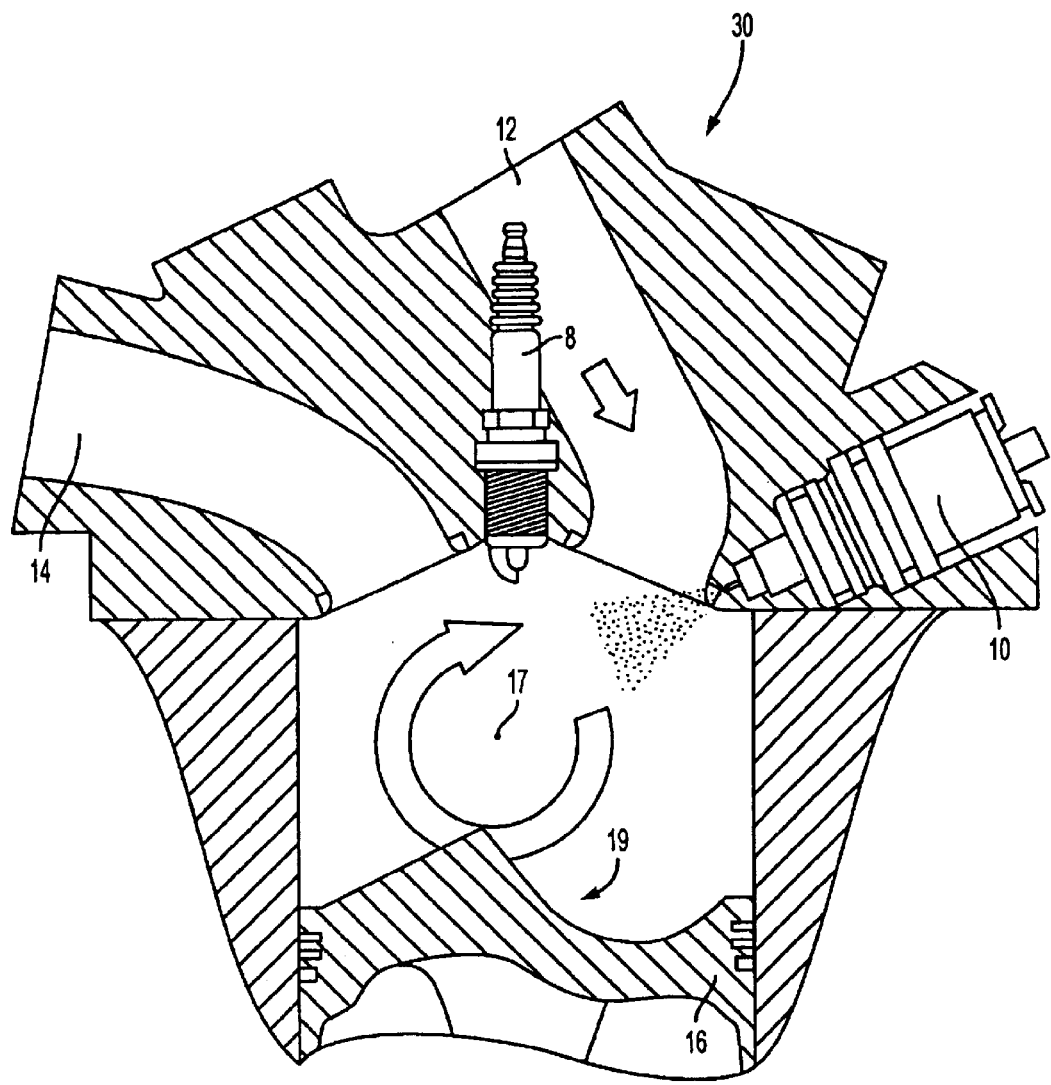
FIG. 3 shows a prior-art direct-injection engine that utilizes a piston having a curved top to create a tumbling motion within a combustion chamber.
Figure 4:
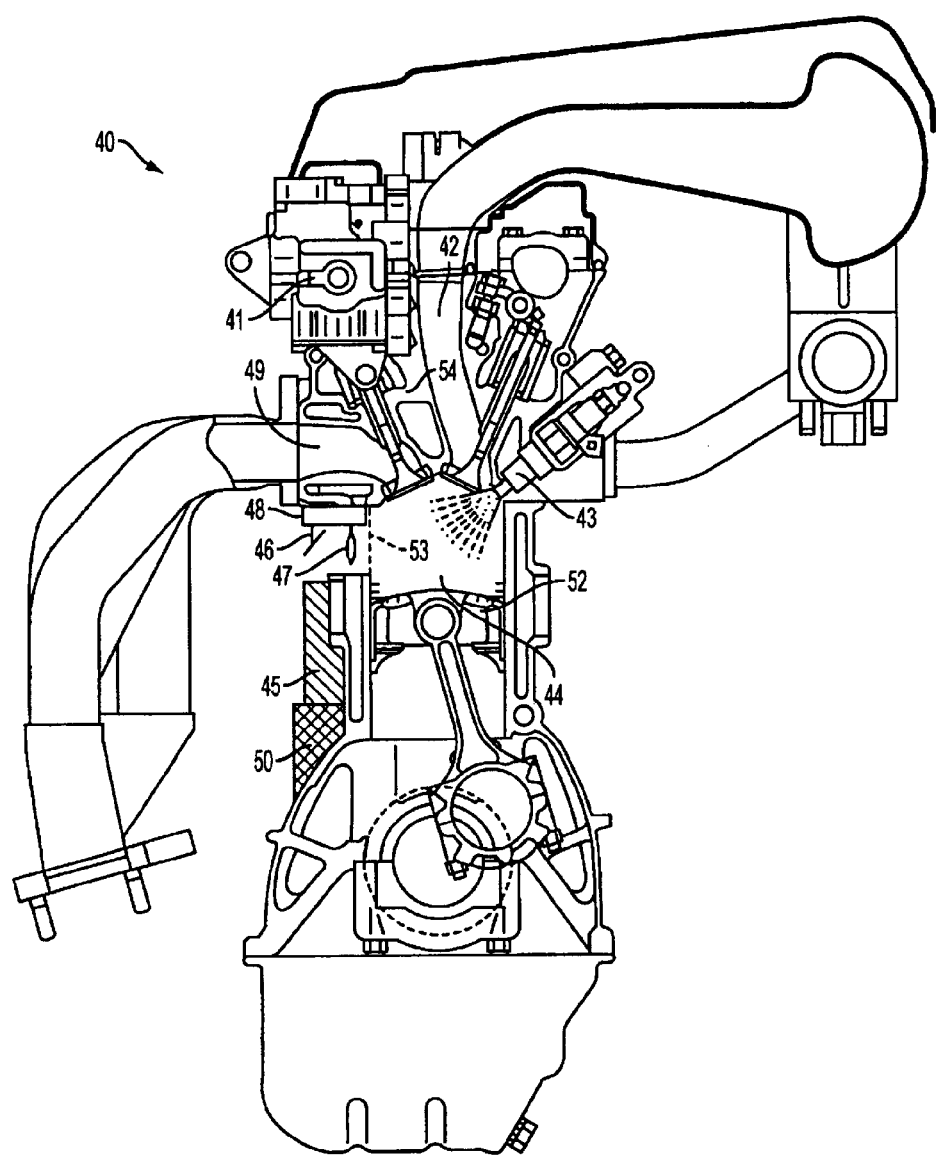
FIG. 4 shows a direct-injection engine according to one embodiment of the present disclosure. Included in this direct-engine is a laser ignition apparatus.

Turning to FIG. 4, there is shown a direct-injection engine 40 according to one embodiment of the present disclosure. It includes, among other components, the following: a high pressure fuel pump 41, an inlet port 42, a fuel injector 43, a combustion chamber 44, a laser 45, a beam steering mechanism 46, adaptive optics apparatus 47, a mounting block 48, an outlet port 49, a control unit 50, a piston 52, and a combustion chamber window 53. Several of these components may be commonly found in the field and do not warrant an exhaustive review herein. Included in that list are at least: the fuel pump, the inlet and outlet ports, the fuel injector, the piston, and the combustion chamber.

Before turning to a detailed description of individual component separately, it is worthwhile to first describe, in general terms, the operation of the engine illustrated in FIG. 4. One will note that the engine of FIG. 4 does not contain a spark plug. This absence is justified by the existence of the laser ignition apparatus illustrated generally through the following components: laser 45, beam steering mechanism 46, adaptive optics apparatus 47, mounting block 48, and control unit 50. These components act to ignite the fuel expelled from fuel injector 43 and the air present within combustion chamber 44. As will be described in more detail below, the laser ignition apparatus described herein has the ability to ignite fuel and/or fuel-air mixtures at more than one ignition location during a single cycle of the engine. It also has the ability to adaptively adjust the position of one or more ignition locations during operation of the engine.

In general, the engine of FIG. 4 provides for the entry of air into combustion chamber 44 during an intake stroke. Subsequently, during a compression stroke, piston 52 is brought upwards toward the fuel injector 43, which emits a spray of fuel as illustrated. Subsequently, one or more pulses of energy are emitted from laser 45 in accordance with signals from control unit 50. These one or more energy pulses are directed into combustion chamber 44 by the beam steering mechanism 46 and the adaptive optics apparatus 47, which may be controlled by control unit 50 or another controlling device suitable to adjust optical components in a controllable manner. The one or more beams of energy enter the combustion chamber 44 through the combustion chamber window 53 that may be located conveniently within the combustion chamber. The window 53 shown in FIG. 4 is through the cylinder liner, but other locations are also possible such as through the head, or even through the piston. Within combustion chamber 44, the one or more pulses of energy ignite the fuel from fuel injector 43 and/or a fuel-air mixture within combustion chamber 44.

The laser ignition process may take place by any one or combination of at least three mechanisms. In particular, the ignition may arise from: (1) photochemical, (2) thermal ignition, and/or (3) laser-induced spark (LIS).

In photochemical ignition, laser photons dissociate target molecules into highly reactive radical species. These radicals then initiate a rapid chemical chain reaction, or combustion. As is known in the art, photochemical ignition requires a close match between the laser excitation wavelength and the target molecule's absorption wavelength in order for dissociation to occur. Only radiation of sufficient energy at these matching (resonant) wavelengths can bring about dissociation and start the combustion successfully and efficiently. For example, and as is known in the art, to dissociate oxygen molecules, $O_2$, wavelength of 157 nm (F laser line) or 193 nm (ArF laser line) can be used. Photochemical ignition requires only a small amount of laser energy, typically less than a milli-Joule for $O_2/H_2$ and some $O_2$ and hydrocarbon mixtures. In comparison with other ignition mechanisms, photochemical ignition can be used to ignite mixtures at lower pressure and closer to the flammability limits, so long as a sufficient amount of reactive radicals can be generated from the target molecules. Photochemical ignition requires energetic laser photons, usually at a wavelength of less than 700 nm.

The second mechanism, thermal ignition, uses a laser beam to increase the kinetic energy, in either translational, rational, or vibrational form, of target molecules. As a result, molecular bonds are eventually broken and chemical reactions can take place. The ignition delay time is typically longer compared to the other two laser ignition mechanisms, and close matching between the laser wavelength and the target molecule's absorption wavelength is helpful. This mechanism can easily be used to ignite combustibles in combination of solid, liquid, and gas phases. Heating of the material with this technique is mostly done with infrared lasers.

In LIS ignition, a laser beam is focused to create a plasma kernel, or spark, via either multiphoton absorption, or the inverse Bremstrahlung process. This spark emits light, heat, and a shock wave to the surrounding medium, supplying energy to initiate combustion. LIS ignition is mainly a thermal chemical process in which the heat generated in both the laser spark and the emanating shock wave is responsible for ignition. To produce sparks for ignition, laser beams are typically pulsed at a Q-switch pulse duration of about 10 nanoseconds, and focused, to provide the high power density ($W/cm^2$) required. Infrared (10.6 $\mu$m) and near infrared (1.06 $\mu$m) are only two of the many wavelengths that have been used to ignite $O_2/H_2$ and hydrocarbon mixtures. As is known in the art, LIS ignition may be less selective in its laser wavelength than the other two mechanisms. In fact, so long as this laser power density, or irradiance, at the focus is sufficiently high to generate heat for ignition, it appears to matter little what laser wavelength is used. LIS ignition may be applied to ignite gaseous mixtures or liquid fuel. One shortcoming of LIS, however, is that it tends to generate shock waves in gaseous mixtures and eject particles from liquids and solids.

As will be described in conjunction with a description of the adaptive optics apparatus 47, the one or more pulses of energy used to ignite fuel, and/or air-fuel mixtures, may be adjusted so as to cause ignition at various locations within combustion chamber 44. This ability, in turn, allows for great flexibility and provides ways to minimize fuel-wall interactions and to simplify the fuel injection and intake air motion control systems within an engine.

Laser 45 may be any laser apparatus known in the art that his capable of emitting sufficient energy to create a discharge in the focal point of the focused laser beam. In one embodiment, laser 45 may be a pulsed laser exhibiting a power of about 100 mJ per pulse, although it will be understood that any other suitable power range may be used. In one embodiment, laser 45 may be an Nd:YAG laser operating in the 1064 nm wavelength range. The wavelength of the laser may be tailored to the resonant frequency of certain molecules such as methane or other molecules depending on the selected fuel. In one embodiment, the laser beam may be configured to generate a non-quenching laser spark in a period of about ten nanoseconds.

In one embodiment, laser 45 may be a Nd:YAG laser having the following model designation: Spectra Physics DCR-1 2130 operated at the 1064-nm wavelength, which is in the infrared part of the spectrum. Again, such a wavelength may be selected because it is near the resonant frequency of certain gas molecules, such as natural gas. As is known in the art, the laser pulse energy may be monitored using an appropriate probe; in one embodiment, a Molectron laser probe model J-25 may be used. As is also known in the art, several other suitable wavelengths may be employed to achieve ignition, and several different makes and modes of lasers may be correspondingly employed.

Laser 45 may be mounted in appropriate proximity to combustion chamber 44 by any mounting means known in the art. As illustrated, laser 45 is mounted directly adjacent to combustion chamber 44 and piston 52. Such a mounting may be accomplished by any number of mechanical methods known in the art. For instance, laser 45 may be mounted as illustrated by welding a laser enclosure onto the engine apparatus. Laser 45 may be protected from high heat conditions and vibrations of the engine by any appropriate means known in the art.

Control unit 50 of FIG. 4 may be coupled to laser unit 45 (and adaptive optics apparatus 47) or it may be integral with laser unit 45. Control unit 50 may include one or more modules for controlling laser 45 and/or adaptive optics apparatus 47. For instance, control unit 50 may include a laser control circuit and/or an ignition timing control circuit. As is known in the art, the laser control circuit may control laser oscillations in synchronism with ignition timing. The ignition timing control circuit, on the other hand, may include a control circuit that includes an ignition timing calculating circuit that detects engine operating conditions and calculates the ignition timing. Further description of such an exemplary control unit may be found at least within U.S. Pat. No. 4,416,226, which has already been incorporated by reference herein.

In another embodiment, an Electronic Control Unit (ECU) may be used as control unit 50, or in conjunction with control unit 50. Modern internal combustion engines are routinely equipped with one or more ECUs that are used to control various aspects of the operation of the engine. In spark ignition engines, the ECU generally controls the fuel rate, the timing of the fuel injection process (for injected engines), the ignition timing (spark timing), and the air-fuel ratio. These units generally incorporate sensors, such as a shaft encoder to identify crankshaft location and rotational velocity, knock sensors, and air-fuel ratio sensors. The units are typically microprocessor-based devices with several channels of input and output. Such units may be adapted in the various embodiments herein to control the timing of laser pulses and the adaptive optics.

The beam steering mechanism 46 of FIG. 4 may be any number of optical components suitable to direct one or more pulses of energy from laser 45 toward combustion chamber 44. Illustrated in FIG. 4 is a mirror attached to mounting block 48 that is suited to adapt pulses of energy approximately 90 degrees from laser 45 toward the combustion chamber window 53. This illustration is meant for exemplary purposes only, and it will be understood by those having ordinary skill in the art, with the benefit of the present disclosure, that beam steering mechanism 46 may involve several lenses and other optical component to focus, shape, steer, or generally affect the optical properties of radiation being emitted from laser 45. In one embodiment, beam steering mechanism 46 may include optics elements such as: a 45-degree reflecting mirror or a plano-convex focusing lens. Such a lens may have, in one embodiment, a diameter of about 25.4 mm and a focal length of appropriate length to focus the beam within combustion chamber 44.

The combustion chamber window 53 of FIG. 4 may be made of any material suitable to transmit radiation. In one embodiment, it may be made of quartz or sapphire, although those having skill in the art will recognize that many other materials may be used. The location and size of the window 53 in FIG. 4 in meant for exemplary purposes only. Other embodiments include a window location in the cylinder head 54. The window size is limited only by the diameter of the laser beam. In one embodiment, window 53 may be cleaned using laser 45. In particular, adaptive optics apparatus 47 can be used to steer radiation to window 53 for a cleaning cycle. This cleaning cycle can take place during operation of the engine at any point during a cycle or during a time when the engine is not running. Appropriate sensors known in the art can be used to monitor the throughput of window 53 to determine when cleaning is necessary. At that time, the cleaning cycle may be initiated.

Figure 5:
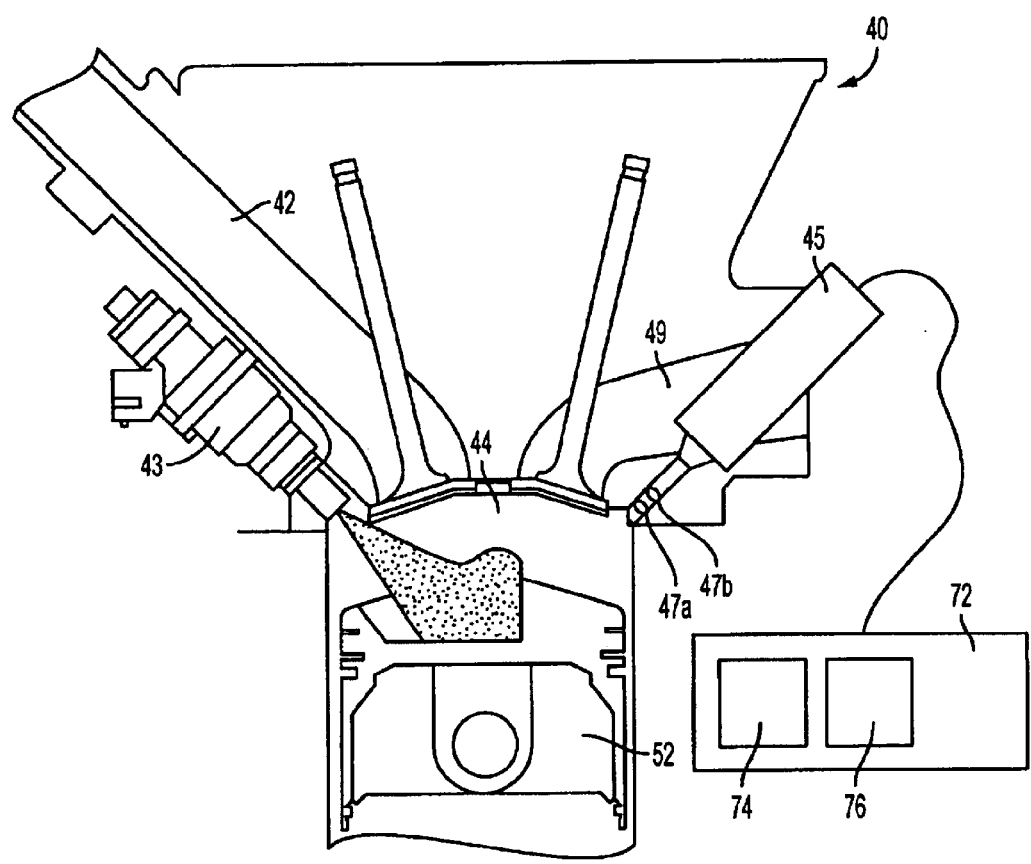
FIG. 5 shows a direct-injection engine according to another embodiment of the present disclosure. It too includes a laser ignition apparatus.

FIG. 5 illustrates another embodiment of the present disclosure. Included in FIG. 5 are engine 70, inlet port 42, fuel injector 43, combustion chamber 44, laser 45, adaptive optics apparatus 47a and 47b, outlet port 49, control unit 72 with modules 74 and 76, and piston 52. In this embodiment, the arrangement of laser 45 obviates the need for the beam steering mechanism 46 included in FIG. 4. Additionally, control unit 72 of FIG. 5 explicitly illustrates two modules—modules 74 and 76—which may correspond to the laser control circuit and/or an ignition timing control circuit. Alternatively, those modules (there may be more than two modules) may include interfaces for operation with appropriate detection units that monitor and/or evaluate engine operating conditions and parameters. Further, the modules may include control algorithms for operating the adaptive optics apparatus. In FIG. 5, the adaptive optics apparatus is illustrated as having two components (47a and 47b) to show that multiple optical components may be used.

The adaptive optics apparatuses 47 of FIG. 4 and 47a and 47b of FIG. 5 may include one or more optical devices that are suitable to quickly adjust the positioning of radiation emitted from laser 45. As described earlier, the phrase "adaptive optics" is simply meant to convey that the optical elements are adjustable in some manner in a controllable fashion (which may be programmable) so that pulses of radiation may be directed to one or more different locations within, for instance, a combustion chamber 44. Adaptive optics apparatuses may take several forms, as will be apparent to those having skill in the art with the benefit of the present disclosure.

Figure 6A:
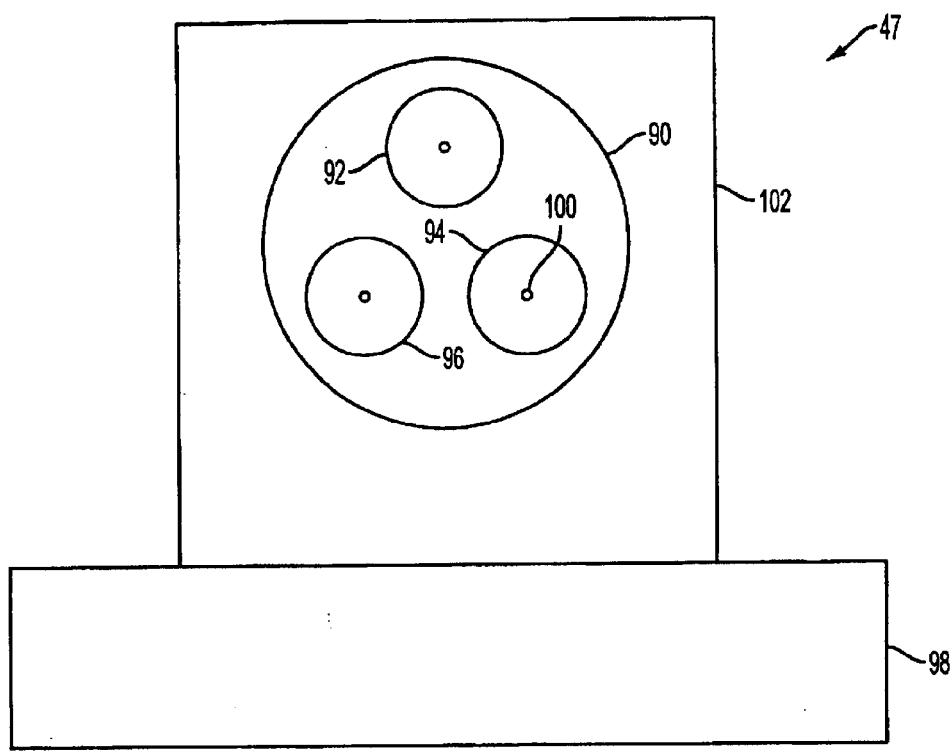
FIG. 6A shows a front view of an adaptive optics apparatus according to one embodiment of the present disclosure.

Adaptive optics apparatuses may include deformable mirrors, tip/tilt platforms, or any other active optical components that may be moved, adjusted, or whose optical properties may be changed so that a beam of radiation may thereby be steered and focused. One example of a suitable type of adaptive optics apparatus is illustrated in FIG. 6A. There, a mirror coupled to three piezoelectric actuators is shown. Specifically, adaptive optics apparatus 47 shown in FIG. 6A includes: deformable mirror 90, piezoelectric actuators 92, 94, and 96, mounting base 98, ball bearings 100, and support structure 102.

Figure 6B:
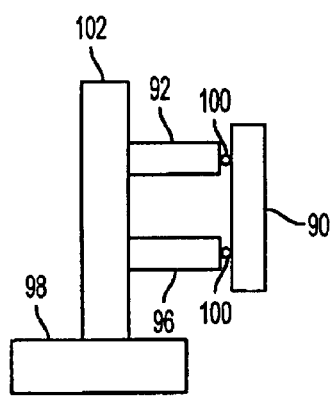
FIG. 6B shows a side view of an adaptive optics apparatus according to one embodiment of the present disclosure.

Shown in FIG. 6B is a side view of the apparatus illustrated in FIG. 6A. There, the relative orientations of ball bearings 100, piezoelectric actuators 92 and 96, support 102, mirror 90, and support 98 may be seen more clearly. As is understood in the art, by sending the appropriate signals to one or more of the piezoelectric actuators, mirror 90 can be tilted or tipped in any direction so as to achieve "on-the-fly" beam steering in a controllable, programmable fashion.

Although illustrated as a triangular arrangement of three piezoelectric actuators, those having skill in the art will understand, with the benefit of the present disclosure, that several other arrangements may be used to achieve a suitable adaptive optics apparatus 47. For instance, mechanical deflection means (which may be actuated electronically in a highly-controllable manner) may be used to tip and/or tilt any optical device to steer radiation. Additionally, suitable adaptive optics apparatus may simply involve a laser 45 configured on a controllable platform so that its output direction may be manipulated by manipulating the position or orientation of the platform.

The controllable beam steering made possible by mechanisms such as the one illustrated in FIG. 6 can, through the use of appropriate feedback, be made "adaptive" to one or more operating conditions of the engine in which the adaptive optics apparatus 47 is installed. As is known in the art, a portion of piezoelectric actuator system output (and/or output from another electronic device) may be returned to the actuator controller(s) as input to maintain performance of the adaptive optics apparatus or to control its operation in an evaluative manner. This feedback may be associated with one or more detected conditions of the engine.

In particular, one or more detection units known in the art (not shown) may sense a condition of the engine, such as engine knock, and may relay corresponding information to the controller(s) of adaptive optics apparatus 47 so that appropriate piezoelectric actuators 92, 94, and/or 96 may be adjusted so that mirror 90 can be tilted to steer one or more pulses of radiation from laser 45 into combustion chamber 44 to suitable ignition location(s) that will eliminate (or reduce) the occurrence of the detected problem(s). Specifically, the piezoelectric actuators may be actuated, monitored, and controlled with appropriate feedback from the detection units.

This type of adaptive adjustment provides great advantages over convention internal combustion engines. For instance, engine knock may be reduced. Engine knock may be monitored within an engine by any method known in the art, the engine knock information may act as feedback to an adaptive optics apparatus, and the adaptive optics apparatus may be adjusted electronically (with the benefit of feedback) so as to reduce the occurrence of the knocking.

The present disclosure also allows for adaptive adjustment according to engine load. For instance, engine load may be monitored within an engine by any method known in the art, the load information may act as an input to an adaptive optics apparatus, and the adaptive optics apparatus may be adjusted electronically according to optimum performance for that load condition. In one embodiment (an embodiment involving a direct injection gasoline engine), as the load is varied from light load, with late-cycle injections for stratified charge operation, to high load, adaptive optics may be made to direct and focus laser radiation from the fuel jet to the center of the combustion chamber for early cycle injection for homogeneous charge operation. The current practice, in contrast, is to attempt to direct the fuel jet at the spark plug location for the light-load stratified charge operation. This represents a compromise because fuel wall interactions occur, resulting in incomplete combustion and leading to reduced efficiency and high unburned hydrocarbon emissions. The high load homogeneous charge operation is also a compromise because of the fixed location of ignition near the combustion chamber wall, which affects the knock tolerance of the engine.

In another embodiment (an embodiment involving a natural gas engine), the use of laser ignition with adaptive optics allows for the delivery of the required ignition energy for lean or dilute mixtures, eliminating the spark plug durability problem commonly observed in these engines. The adaptive optics combined with the rapid pulse capability of lasers allows for the use of multiple ignition events at different locations in the combustion chamber during each engine cycle. This improves the ignition of lean and dilute fuel-air mixtures and dramatically improves the knock-tolerance of the engine.

The present disclosure also allows for adaptive adjustment according to engine type. For instance, the ignition apparatus according to the present disclosure may be configured to focus radiation at different locations, depending on whether the engine is a direct-injection or port-injection engine. Similarly, the ignition locations may be different depending on whether the engine is gasoline or natural gas. The choice of ignition location may be optimized for any number of other parameters, as will be understood by one having skill in the art.

The present disclosure also allows for adaptive adjustment according to any other preference of the user. For instance, in one embodiment, the engine operator may manually adjust ignition locations to adapt to a parameter or condition of his or her choice.

Embodiments of the present disclosure not only provide adaptive adjustment of ignition, but they also provide multiple ignition locations during a single cycle of an engine. In other words, laser 45 may be configured to fire two or more ignition pulses of radiation, at different locations, during, for instance, a single stroke of a piston. Each pulse may be directed to its respective location via an adaptive optics apparatus such as the one illustrated in FIG. 6. This ability provides for many significant advantages, as will be understood by one having skill in the art.

For instance, embodiments of the present disclosure may prevent engine knock. Because the spark plugs in many gasoline direct injected engines are not symmetric, the flame has to move across a very long distance. Many times, the unburned fuel ahead of the flame gets hot and eventually detonates, causing engine knock. Unlike conventional methods, which try to change spark timing to reduce knock, embodiments of the present invention pulse a laser ignition apparatus more than once (and possibly at more than one location) during a single engine cycle. Using multiple ignition locations allows for multiple flames that reduce combustion duration and flame travel times. As known by one of ordinary skill in the art, this will reduce knock.

In one embodiment, a first pulse may be directed to one side of the combustion chamber with adaptive optics, and a second pulse may then directed to the other side with those optics. The number of pulses possible per engine is dictated, at least in part, by the pulse rate of the laser being employed and the speed of the adaptive optics.

Embodiments using multiple ignition locations during a single engine cycle can not only prevent engine knock, but can also allow users to run leaner fuel mixtures. One of the big problems with lean mixtures is that the flame travels slowly. Thus, many times, an entire engine cycle is over before the combustion is complete; correspondingly, unburned gasses are exhausted. Igniting in multiple locations during a single cycle, however, can address this problem. For instance, fuel may be ignited on opposite sides of the combustion chamber, which effectively speeds flame's velocity by reducing the distance the flame has to travel. Multiple ignition locations can also advantageously raise the temperature, the rate of temperature rise, and increases overall burning rate.

Figure 7:
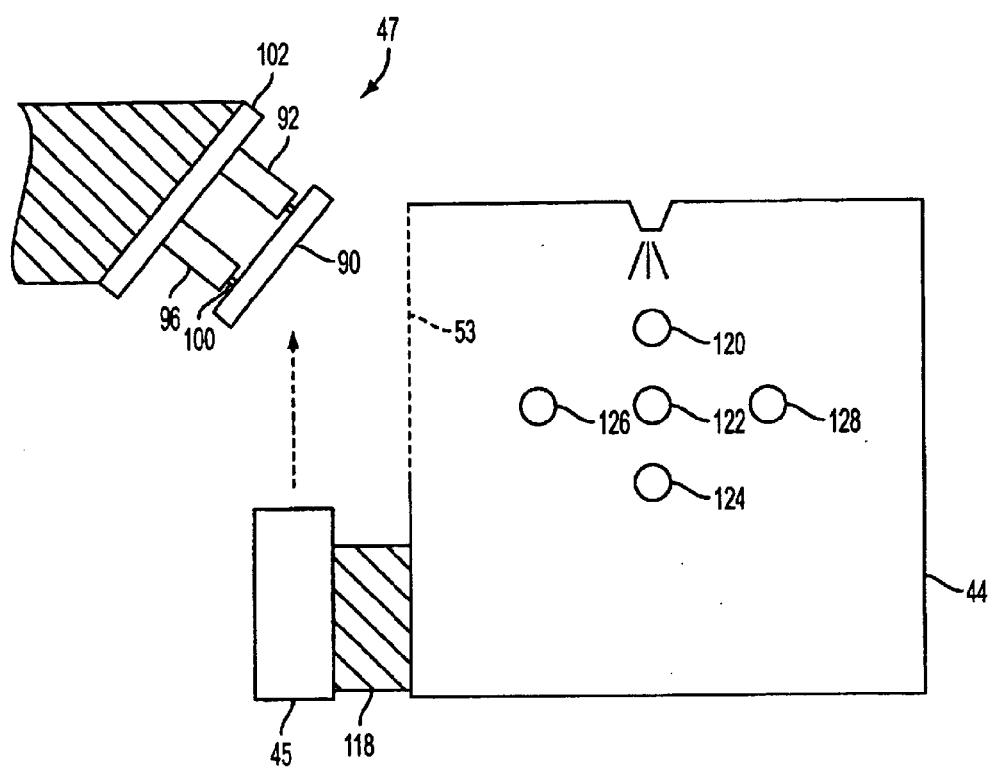
FIG. 7 shows a block diagram of a combustion chamber and laser ignition apparatus according to one embodiment of the present disclosure. Shown are various ignition locations within the combustion chamber.

FIG. 7 illustrates the principles discussed above—adaptive adjustment and multiple ignition locations during a single cycle. In FIG. 7, there is shown an internal combustion chamber 44, laser 45, adaptive optics apparatus 47, laser mount 118, and window 53. Adaptive optics apparatus 47, laser 45, combustion chamber 44, and window 53 have been described above. Also included in FIG. 7 are illustrations of several potential ignition locations: locations 120, 122, 124, 126, and 128.

FIG. 7 illustrate that laser 45 may work in conjunction with adaptive optics apparatus 47 to steer one or more pulses of laser radiation through combustion chamber window 53 to ignite fuel or fuel-air mixture at any one or more of the ignition locations enumerated above. For instance, during a first engine cycle, adaptive optics apparatus 47 may steer and focus a pulse of radiation to cause ignition to occur at location 120. Consequently, it may be determined (e.g., by one or more detection units, by the user, or by some other means) that the engine would run more optimally if its ignition location were moved closer to the center of the combustion chamber. During the second engine cycle, adaptive optics apparatus 47 may adaptively (i.e., in response to the determination mentioned in the previous sentence) adjust the ignition location to location 122. Consequently, it may determined that the ignition location should still be more centrally-located. During the third engine cycle, adaptive optics apparatus 47 may adaptively adjust the ignition location to location 124.

Likewise, FIG. 7 illustrates multiple ignition locations during a single engine cycle. In one embodiment, laser 45 may focus a first pulse to ignite fuel and/or fuel-air mixtures at location 126. It may focus a second pulse to ignite fuel and/or fuel-air mixtures at location 128. The first and second pulses may occur during a single engine cycle. The first and second pulses may be timed in any one of numerous ways. For instance, both pulses may occur during the early part of the engine cycle. Both pulses may occur late in the cycle. The first pulse may occur early, and the second pulse may occur late. A nearly infinite number of other similar timing schemes will be apparent to those having skill in the art.

FIG. 7 also illustrates multiple ignition locations that are adaptively adjusted during a single engine cycle. In one embodiment, laser 45 may focus a first pulse to ignite fuel and/or fuel-air mixtures at location 126. It may focus a second pulse, during the same engine cycle, to ignite fuel and/or fuel-air mixtures at location 128. Consequently, it may be determined that the engine would run more optimally if the ignition locations were more towards the left of combustion chamber 44. During a subsequent engine cycle, adaptive optics apparatus 47 may adaptively adjust the ignition locations to occur at locations 126 and 122. As before, the first and second pulses may be timed in any one of numerous ways. For instance, both pulses may occur during the early or late part of the engine cycle. The first pulse may occur early, and the second pulse may occur late. A nearly infinite number of other similar timing schemes will be apparent to those having skill in the art.

Figure 8:
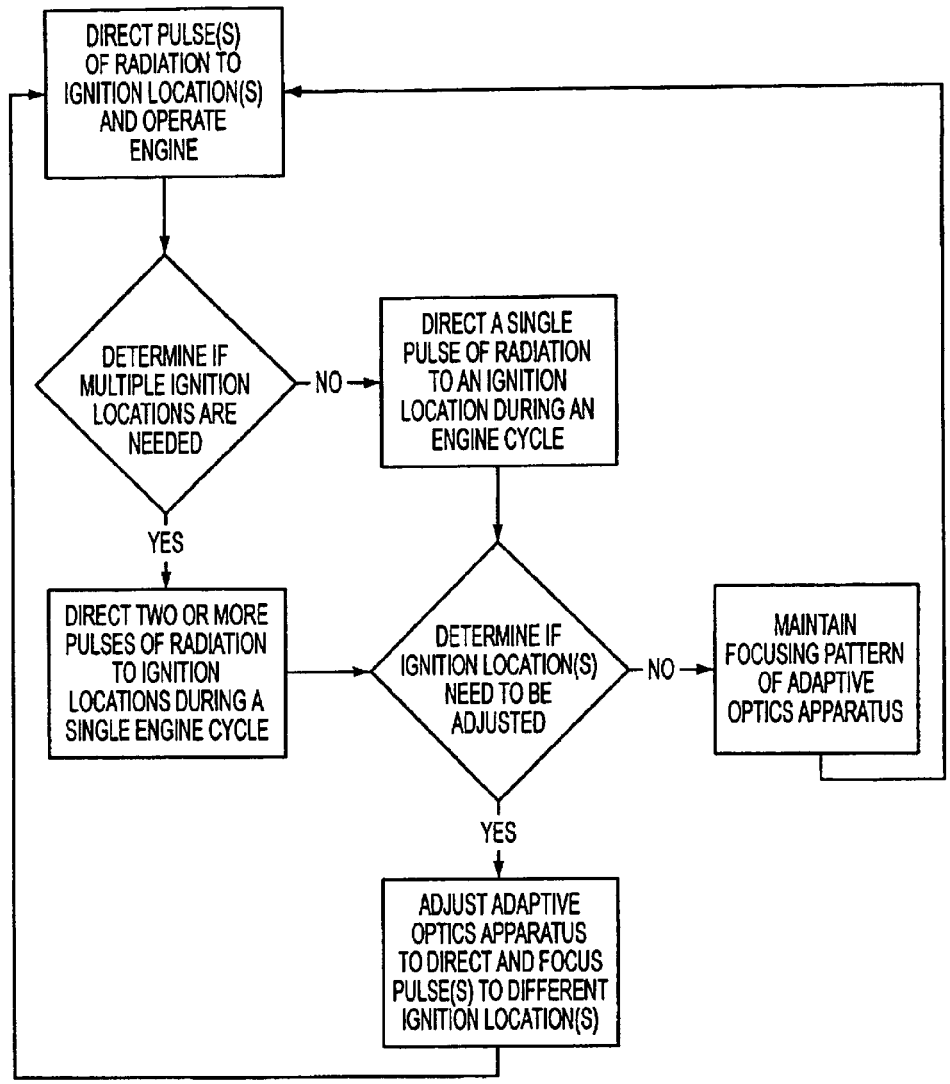
FIG. 8 shows a flowchart of an exemplary process according to one embodiment of the present disclosure.

Turning now to FIG. 8, there is shown a flow chart illustrating methods of operation in accordance with embodiments of the present invention. The steps of FIG. 8 are self-explanatory. In general, they exhibit the adaptive adjustment of one or more ignition locations during engine operation.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims.

Moreover, the different aspects of the disclosed apparatus and methods may be utilized in various combinations and/or independently. Thus the invention is not limited to only those combinations shown herein, but rather may include other combinations. Those of skill in the art will understand that numerous other modifications may be made to the disclosed method and apparatus, but all such similar substitutes and modifications are deemed to be within the spirit, scope and concept of the invention.

What is claimed is:

1. A laser ignition apparatus for an internal combustion engine, comprising:
    a combustion chamber defining one or more ignition locations;
    a laser in optical communication with the combustion chamber; and
    adaptive optics in optical communication with the combustion chamber and the laser, the optics configured to adaptively adjust the position of the one or more ignition locations during operation of the engine as a function of the operating conditions of the engine.

2. The apparatus of claim 1, wherein the internal combustion engine comprises a gasoline engine.

3. The apparatus of claim 2, wherein the internal combustion engine comprises a direct injection gasoline engine.

4. The apparatus of claim 2, wherein the internal combustion engine comprises a port injected gasoline engine.

5. The apparatus of claim 1, wherein the internal combustion engine comprises a natural gas engine.

6. The apparatus of claim 1, the optics configured to adaptively adjust the position of the one or more ignition locations as a function of engine speed or load.

7. The apparatus of claim 1, the optics configured to adaptively adjust the position of the one or more ignition locations as a function of engine knock.

8. A laser ignition apparatus for providing multiple ignition locations during a cycle of an internal combustion engine, comprising:
    a combustion chamber defining a first and second ignition location;
    a pulsed laser in optical communication with the combustion chamber; and
    adaptive optics in optical communication with the combustion chamber and the laser, the optics configured to direct a first pulse of laser radiation to the first ignition location and after the first pulse of laser radiation, direct a second pulse of laser radiation to the second ignition location during a single cycle of the engine.

9. The apparatus of claim 8, the adaptive optics further configured to adaptively adjust the position of the first or second ignition location during operation of the engine.

10. The apparatus of claim 9, the optics configured to adaptively adjust the position of the first or second ignition location as a function of engine speed or load.

11. The apparatus of claim 9, the optics configured to adaptively adjust the position of the first or second ignition location as a function of engine knock.

12. The apparatus of claim 8, wherein the internal combustion engine comprises a gasoline engine.

13. The apparatus of claim 12, wherein the internal combustion engine comprises a direct injection gasoline engine.

14. The apparatus of claim 12, wherein the internal combustion engine comprises a port injected gasoline engine.

15. The apparatus of claim 8, wherein the internal combustion engine comprises a natural gas engine.

16. A method for laser ignition in an internal combustion engine, comprising:
    directing laser radiation to a first ignition location within a combustion chamber with adaptive optics; and
    adaptively adjusting the position of the ignition location to a second ignition location during operation of the engine using the adaptive optics, as a function of the operating conditions of the engines where the engine comprises a combustion chamber defining the first and second ignition locations.

17. The method of claim 16, the adaptively adjusting comprising adjusting the position of the ignition location as a function of engine speed or load.

18. The method of claim 16, the adaptively adjusting comprising adjusting the position of the ignition location as a function of engine knock.

19. The method of claim 16, wherein the internal combustion engine comprises a gasoline engine.

20. The method of claim 19, wherein the internal combustion engine comprises a direct injection gasoline engine.

21. The method of claim 19, wherein the internal combustion engine comprises a port injected gasoline engine.

22. The method of claim 16, wherein the internal combustion engine comprises a natural gas engine.

23. The method of claim 16, further comprising directing laser radiation to a combustion chamber window with the adaptive optics to clean the window.

24. A method for providing multiple ignition locations during a cycle of an internal combustion engine, comprising:
 (a) directing a first pulse of laser radiation to a first ignition location within a combustion chamber with adaptive optics; and
 (b) directing a second pulse of laser radiation, after the first pulse of laser radiation, to a second ignition location within the combustion chamber using the adaptive optics, where steps (a) and (b) occur during a single cycle of the engine.

25. The method of claim 24, further comprising adaptively adjusting the position of the first or second ignition location during operation of the engine using the adaptive optics.

26. The method of claim 25, the adaptively adjusting comprising adjusting the position of the first or second ignition location as a function of engine speed or load.

27. The method of claim 25, the adaptively adjusting comprising adjusting the position of the first or second ignition location as a function of engine knock.

28. The method of claim 24, wherein the internal combustion engine comprises a gasoline engine.

29. The method of claim 28, wherein the internal combustion engine comprises a direct injection gasoline engine.

30. The method of claim 28, wherein the internal combustion engine comprises a port injected gasoline engine.

31. The method of claim 24, wherein the internal combustion engine comprises a natural gas engine.

32. The method of claim 24, further comprising directing a third pulse of laser radiation to a combustion chamber window with the adaptive optics to clean the window.

33. The apparatus of claim 1, wherein the internal combustion engine comprises a direct injection engine, and the adaptive optics are further configured to direct laser radiation at a fuel jet.

34. The apparatus of claim 8, wherein the internal combustion engine comprises a direct injection engine, and the adaptive optics are further configured to direct laser radiation at a fuel jet.

35. The method of claim 16, wherein the internal combustion engine comprises a direct injection engine, and further comprising directing laser radiation at a fuel jet.

36. The method of claim 24, wherein the internal combustion engine comprises a direct injection engine, and further comprising directing laser radiation at a fuel jet.

* * * * *